United States Patent
Yao

(10) Patent No.: US 10,918,124 B2
(45) Date of Patent: Feb. 16, 2021

(54) EXTRACTION, PURIFICATION, AND PROCESSING OF PHYTOGLYCOGEN

(75) Inventor: Yuan Yao, West Lafayette, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 907 days.

(21) Appl. No.: 14/130,412

(22) PCT Filed: Aug. 2, 2012

(86) PCT No.: PCT/US2012/049378
§ 371 (c)(1),
(2), (4) Date: Mar. 3, 2014

(87) PCT Pub. No.: WO2013/019977
PCT Pub. Date: Feb. 7, 2013

(65) Prior Publication Data
US 2014/0186495 A1 Jul. 3, 2014

Related U.S. Application Data

(60) Provisional application No. 61/514,681, filed on Aug. 3, 2011, provisional application No. 61/514,399, filed on Aug. 2, 2011.

(51) Int. Cl.
*A23L 33/105* (2016.01)
*A23L 29/10* (2016.01)
*A23L 29/30* (2016.01)

(52) U.S. Cl.
CPC .......... *A23L 33/105* (2016.08); *A23L 29/10* (2016.08); *A23L 29/35* (2016.08)

(58) Field of Classification Search
None
See application file for complete search history.

(56) References Cited

U.S. PATENT DOCUMENTS

| | | | | |
|---|---|---|---|---|
| 4,970,158 A | * | 11/1990 | Outtrup | C12N 9/2425 435/201 |
| 5,895,686 A | * | 4/1999 | Horino | A23L 1/052 426/459 |
| 6,323,338 B1 | * | 11/2001 | Potter | C08B 37/0024 424/401 |
| 2004/0092732 A1 | * | 5/2004 | Antrim | C08B 30/18 536/123.13 |

(Continued)

OTHER PUBLICATIONS

Inouchi et al. "Development Changes in Fine Structure of Starches of Several Endosperm Mutants of Maize" Starch/Starke 1983 vol. 35 No. 11 pp. 371-376 (Year: 1983).*

(Continued)

*Primary Examiner* — Felicia C Turner
(74) *Attorney, Agent, or Firm* — Woodard, Emhardt, Henry, Reeves & Wagner, LLP

(57) ABSTRACT

Improved method for purifying extracts containing phytoglycogen or certain derivatives thereof which comprises the step of subjecting the extracts to ultrafiltration. Methods for providing a lower viscosity phytoglycogen material by subjecting an extract containing phytoglycogen (or purified phytoglycogen) to beta-amylase treatment. Methods for preparing beta-dextrins or derivatives thereof from phytoglycogens or derivatives thereof.

7 Claims, 3 Drawing Sheets

(56) References Cited

U.S. PATENT DOCUMENTS

2009/0123638 A1* 5/2009 Eyal .................. C12P 17/06
426/658

OTHER PUBLICATIONS

Bi, L., et al., Designing carbohydrate nanoparticles for prolonged efficacy of antimicrobial peptide. Journal of Controlled Release 150 (2011) 150-156.

Bi, L., et al., Carbohydrate Nanoparticle-Mediated Colloidal Assembly for Prolonged Efficacy of Bacteriocin Against Food Pathogen. Biotechnol. Bioeng. 2011;108: 1529-1536.

Boyer, C. D., et al., Starch and Water-Soluble Polysaccharides From Sugary Endosperm of Sorghum. Phytochemistry, vol. 22, pp. 2513-2515 (1983).

Burton, R. A., et al., Starch granule initiation and growth are altered in barley mutants that lack isoamylase activity. The Plant Journal (2002) 31(1), 97-112.

Huang, L. et al., Particulate structure of phytoglycogen nanoparticles probed using amyloglucosidase. Carbohydrate Polymers 83(2011) 1665-1671.

James, M. G., et al., Characterization of the Maize Gene sugary1, a determinant of Starch Composition in Kernels. The Plant Cell, vol. 7, 417-429, Apr. 1995.

Scheffler, S. L., et al., Phytoglycogen Octenyl Succinate, an Amphiphilic Carbohydrate Nanoparticle, and ε-Polylysine to Improve Lipid Oxidative Stability of Emulsions. J. Agric. Food Chem. 2010, 58, 660-667.

Scheffler, S. L., et al., In Vitro Digestibility and Emulsification Properties of Phytoglycogen Octenyl Succinate. J. Agric. Food Chem. 2010, 58, 5140-5146.

Shin, J., et al., Glucose Release of Water-Soluble Starch-Related r-Glucans by Pancreatin and Amyloglucosidase Is Affected by the Abundance of r-1,6-Glucosidic Linkages. J. Agric. Food Chem. 2008, 56, 10879-10886.

Zeeman, S. C., et al., A Mutant of Arabidopsis Lacking a Chloroplastic Isoamylase Accumulates Both Starch and Phytoglycogen. The Plant Cell, vol. 10, 1699-1711.

* cited by examiner

EXTRACTION, PURIFICATION, AND PROCESSING OF PHYTOGLYCOGEN

CROSS-REFERENCE TO RELATED APPLICATIONS

This application claims the benefit of, and is a U.S. § 371 national stage entry of, International Patent Application Serial No. PCT/US2012/049378 filed Aug. 2, 2012 which is related to and claims priority to U.S. provisional applications 61/514,399 filed Aug. 2, 2011 and 61/514,681, filed Aug. 3, 2011. Each of these applications is incorporated by reference herein in its entirety.

BACKGROUND OF THE INVENTION

Phytoglycogen is a water-soluble α-D-glucan generated by plants. The largest source of phytoglycogen is the kernel of the maize mutant sugary-1 (su1), a major genotype of sweet corn. The su1 mutation leads to the deficiency of SU1, an isoamylase-type starch debranching enzyme (DBE). During the biosynthesis of starch, starch synthase (SS), starch branching enzyme (SBE), and DBE work coordinately to produce starch granules. It is considered that the primary role of DBE is to trim abnormal branches that inhibit the formation of starch crystals and granules. In the absence of DBE, the highly branched phytoglycogen is formed to replace starch. FIG. 1 shows the TEM image of phytoglycogen particles (Huang & Yao, 2011). Most phytoglycogen particles range in size from 40-50 nm.

As reported in U.S. Pat. No. 5,895,686, plant glycogen (i.e., phytoglycogen) can also be obtained from rice. The extraction method described therein requires a step of precipitation of the plant glycogen employing organic solvent (e.g., methanol). This patent is incorporated by reference herein in its entirety for a description of methods for generation of crude rice extracts containing phytoglycogen, as well as for rice materials from which phytoglycogen can be extracted. U.S. Pat. No. 6,451,362 reports an exemplary use of phytoglycogen for coating and processing of food. This patent is incorporated by reference herein in its entirety, in particular, for additional variations of methods for obtaining crude extracts containing phytoglycogen. Shin et al., 2008 provides descriptions of phytoglycogen extracted from six different sweet corn lines and is incorporated by reference herein for that description. The highly branched structure of phytoglycogen results in its unusually high molecular density in dispersion. The dispersed molecular density of phytoglycogen from maize is about 1200 g/mol/nm$^3$ compared with about 60 g/mol/nm$^3$ for amylopectin (of starch) (Huang & Yao, 2011).

High density creates the structural integrity of phytoglycogen and allows for dense grafting of functional groups at surface. While not fully understood, it is likely that the phytoglycogen particles grow from the non-reducing ends of glucan chains at the surface by periodic branching and elongation of chains. In a phytoglycogen molecule, there is no long chain that connects individual clusters as seen in an amylopectin molecule (Shin et al., 2008), suggesting an important structural difference between phytoglycogen and amylopectin.

Recent studies have shown that phytoglycogen is a carbohydrate material with great application potential due to its digestibility (Shin et al., 2008; Scheffler et al., 2010b), low viscosity, and the possibility of being converted to functional materials (Scheffler et al., 2010a,b; Bi et al., 2011a,b). However, the cost of purifying phytoglycogen can be a barrier to large scale application in the food and other areas. Particularly, the high-cost is caused by using solvent, such as ethanol to precipitate phytoglycogen from a crude extraction liquid. Each of Huang & Yao, 2011 and Shin et al., 2008 is incorporated by reference herein in its entirety at least in part for descriptions of the structure of phytoglycogen.

For example, Huang & Yao, 2011 report a procedure for phytoglycogen extraction which includes grinding dry kernels of sweet corn, soaking the ground material in water, homogenizing to disperse phytoglycogen, filtration and centrifugation for removing insoluble solids and oil, pH adjustment to precipitate protein, and heating and centrifugation to further reduce proteinaceous materials. Thereafter, ethanol is added to the collected liquid to precipitate phytoglycogen and separate out other soluble compounds. The precipitate is then further washed using ethanol before collecting phytoglycogen solid in a power form. In this extraction and purification procedure, the use of ethanol leads to high processing cost. Huang & Yao, 2011 is incorporated by reference herein in its entirety for a description of the structure of phytoglycogen, as well as for details of methods for producing a crude extract containing phytoglycogen from corn. Additional sources of phytoglycogen are sorghum (Boyer & Liu, 1993), barley (Burton et al., 2002) and *Arabidopsis* (Zeeman et al. 1998). The largest source of phytoglycogen is the kernel of the corn mutant sugary-1, a major genotype of commercial sweet corn. The sugary-1 mutation leads to deficiency of SU1, an isoamylase-type starch debranching enzyme (DBE) (James et al. 1995). In the absence of DBE, highly branched phytoglycogen is formed to replace starch granules.

SUMMARY OF THE INVENTION

The invention relates generally to phytoglycogen containing materials and the preparation and purification of such materials.

In one aspect, the present invention provides improved methods for extraction and purification of phytoglycogen from plant materials containing phytoglycogen, and these improved methods do not require ethanol precipitation. In specific embodiments, phytoglycogen is extracted from corn, rice, sorghum or barley with water. In specific embodiments, phytoglycogen is extracted from sweet corn, particularly sweet corn kernels.

Additionally, it has been found that crude phytoglycogen extraction mixtures, particularly those obtained from sweet corn, can be viscous at high concentrations leading to inconvenience and additional cost for subsequent concentration and drying processes.

A process resulting in a less viscous phytoglycogen extract reduces or eliminates such inconvenience and additional cost, and benefits certain applications such as bulking or surface coating. Thus, in another aspect, the present invention provides a method for treating a crude phytoglycogen extract or purified phytoglycogen (or its derivatives) to reduce its viscosity. More specifically, in this aspect, the invention provides a method for providing a lower viscosity phytoglycogen material by subjecting a phytoglycogen-containing extract or purified phytoglycogen to beta-amylolysis (i.e. hydrolysis using beta-amylase). In a specific embodiment, a crude extract containing phytoglycogen is treated with beta-amylase, such that the viscosity of an aqueous solution of beta-amylase treated phytoglycogen is lowered by 25% or more compared to the viscosity of an analogous solution of untreated-phytoglycogen. In other embodiments, crude phytoglycogen extract is subjected to beta-amylase treatment to release maltose. More specifically, beta-amylase treatment is continued until the level of maltose in the extract is 1% (based on the original amount of phytoglycogen) by weight or more.

The invention also provides purified phytoglycogen materials and decreased viscosity phytoglycogen materials produced by the methods herein. More specifically, the invention provides purified phytoglycogen having reduced levels of impurities with molecular weight of 5000 Daltons (Da) or less or having reduced levels of impurities having molecular weight of 300,000 Daltons (Da) or less. In a specific embodiment, the invention provides purified phytoglycogen having 10% by weight or less, 5% by weight or less, or 1% by weight or less of impurities having molecular weight of 5000 Daltons (Da) or less, or impurities having molecular weight of 300,000 Da or less. The invention further provides an alkenyl succinate derivative of a phytoglycogen of this invention.

The purified phytoglycogen and derivatives thereof of this invention can be employed in as a solid, e.g., as a powder, or in the form of an aqueous solution, suspension or dispersion in water. Solid phytoglycogen and derivatives thereof may contain levels of water acceptable for its application.

The invention further provides a method for producing a beta-dextrin and beta-dextrin produced by the method wherein phytoglycogen materials or succinate or alkenyl succinate derivatives of a phytoglycogen of this invention are subjected to treatment with beta-amylase. The invention also provides succinate and alkenyl succinate derivative of a beta-dextrin prepared by this method.

Other aspects of the invention will be apparent on review of the descriptions herein including the drawings and examples.

DETAILED DESCRIPTION OF THE INVENTION

Figure 1:
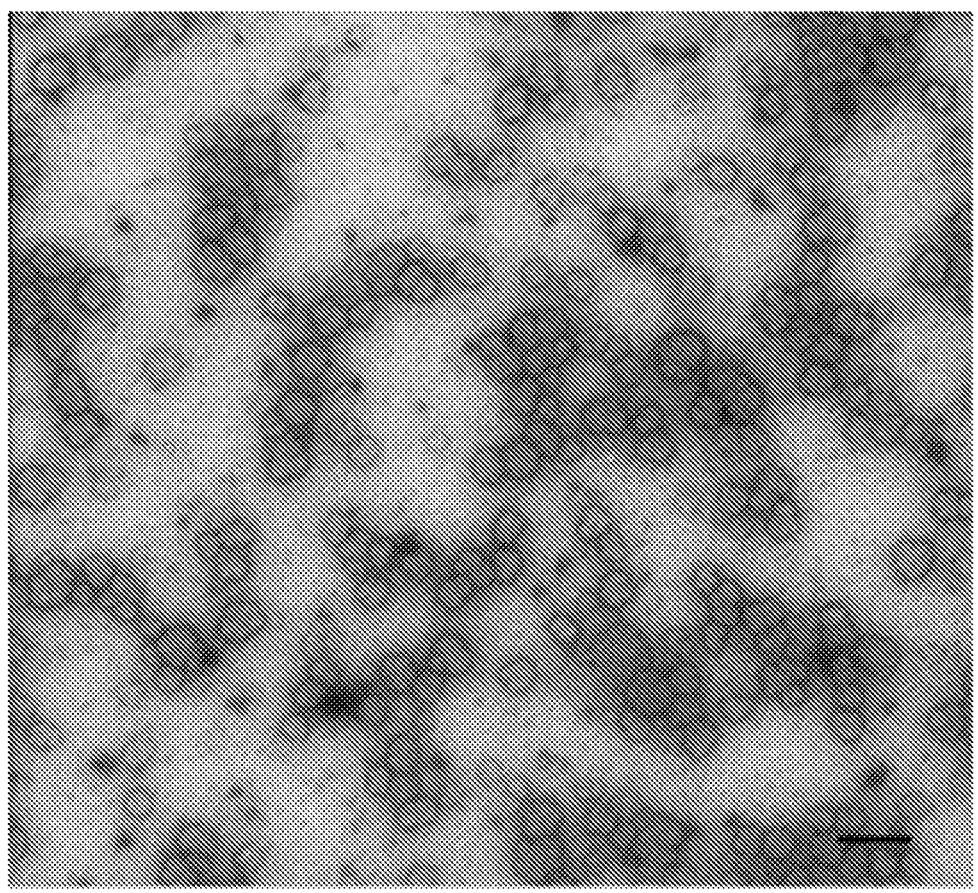
FIG. 1 is a transmission electron microscope image of phytoglycogen particles where the scale bar illustrated is 100 nm.

The invention relates to purified phytoglycogen materials. Purified phytoglycogen materials include compositions containing phytoglycogen and/or certain derivatives of phytoglycogen, including beta-dextrins or other enzymatic or chemical degradation products of phytoglycogen, succinates of phytoglycogen, alkenyl succinates of phytoglycogen, succinates and alkenyl succinates of beta-dextrins or other enzymatic or chemical degradation products of phytoglycogens. In specific embodiments, phytoglycogen materials are purified to reduce impurities having molecular weight less than 5000 Da. In other embodiments, the phytoglycogen materials are purified to reduce impurities having molecular weight less than 10,000 Da. In other embodiments, the phytoglycogen materials are purified to reduce impurities having molecular weight less than about 25,000 Da. In other embodiments, the phytoglycogen materials are purified to reduce impurities having molecular weight less than about 50,000 Da. In other specific embodiments, the phytoglycogen materials are purified to reduce impurities having molecular weight less than about 100,000 Da. In other specific embodiments, phytoglycogen materials are purified to reduce impurities having molecular weight less than about 300,000 Da. In other specific embodiments, phytoglycogen materials are purified to reduce impurities having molecular weight less than about 1000 Da. In specific embodiments, the impurities reduced are saccharides, peptides, proteins or a combination thereof. In the present invention, reduction of impurities is assessed with respect to the level of impurities in the crude extract of phytoglycogen from plant materials. In some embodiments, the level of purity is assessed with respect to a specific amount in terms of weight percent of impurities.

In one aspect, the invention provides an improved method for purifying crude phytoglycogen extract which comprises the step of subjecting the crude phytoglycogen extract to ultrafiltration, and preferably to tangential flow ultrafiltration (also called cross-flow ultrafiltration). The crude extract is a water extract. More specifically, the crude extract is obtained by water extraction of plant material containing phytoglycogen. Yet more specifically, the crude extract is obtained by water extraction of corn, particularly sweet corn, barley, rice, sorghum or *Arabidopsis*. In a specific embodiment, the crude extract is a water extract of fresh or mature corn kernels, particularly sweet corn kernels. Ultrafiltration is applied to obtain purified phytoglycogen with decreased or undetectable levels of low molecular weight impurities, for example mono-, di-, tri- or other oligosaccharides, particularly glucose, sucrose or maltose. In specific embodiments herein, the preparation and purification of phytoglycogen materials does not include precipitation with an organic solvent. In specific embodiments herein, the preparation and purification of phytoglycogen materials does not include precipitation with an alcohol. In more specific embodiments herein, the preparation and purification of phytoglycogen materials does not include precipitation with ethanol.

In specific embodiments, ultrafiltration is continued until the purified phytoglycogen materials contain 10% or less, 5% or less, 3% or less, 2% or less or 1% or less by weight of impurities having molecular weight less than the indicated molecular weights above. In specific embodiments, ultrafiltration is applied to lower the level of saccharides having molecular weight of 300,000 Da or less to less than 10% by weight.

More specifically, the level of such low molecular weight saccharides can be lowered to less than 5%, less than 3%, less than 2% or less than 1% by weight. In specific embodiments, ultrafiltration is applied to lower the level of saccharides having molecular weight of 100,000 Da or less to less than 10% by weight. More specifically, the level of such low molecular weight saccharides can be lowered to less than 5%, less than 3%, less than 2% or less than 1% by weight. In specific embodiments, ultrafiltration is applied to lower the level of saccharides having molecular weight of 50,000 Da or less to less than 10% by weight. More specifically, the level of such low molecular weight saccharides can be lowered to less than 5%, less than 3%, less than 2% or less than 1% by weight. In specific embodiments, ultrafiltration is applied to lower the level of saccharides having molecular weight of 25,000 Da or less to less than 10% by weight.

More specifically, the level of such low molecular weight saccharides can be lowered to less than 5%, less than 3%, less than 2% or less than 1% by weight. In specific embodiments, ultrafiltration is applied to lower the level of saccharides having molecular weight of 10,000 Da or less to less than 10% by weight. More specifically, the level of such low molecular weight saccharides can be lowered to less than 5%, less than 3%, less than 2% or less than 1% by weight. In specific embodiments, ultrafiltration is applied to lower the level of saccharides having molecular weight of 5000 Da or less to less than 10% by weight. More specifically, the level of such low molecular weight saccharides can be lowered to less than 5%, less than 3%, less than 2% or less than 1% by weight. In specific embodiments, ultrafiltration is applied to lower the level of saccharides having molecular weight of 1000 Da or less to less than 10% by weight.

More specifically, the level of such low molecular weight saccharides can be lowered to less than 5%, less than 3%, less than 2% or less than 1% by weight. For certain applications, it is preferred to minimize the level of low molecular weight compounds, particularly saccharides, in the phytoglycogen preparation and as such in a specific embodiment, ultrafiltration is continued until the amount of such low molecular weight compounds, particularly saccharides, are minimized.

In more specific embodiments, tangential flow ultrafiltration is employed to reduce low molecular weight impurities having molecular weight less than about 300,000. In more specific embodiments, tangential flow ultrafiltration is employed to reduce low molecular weight impurities having molecular weight less than about 100,000. In other more specific embodiments, tangential flow ultrafiltration is employed to reduce low molecular weight impurities having molecular weight less than about 50,000. In other more specific embodiments, tangential flow ultrafiltration is employed to reduce low molecular weight impurities having molecular weight less than about 25,000. In other more specific embodiments, tangential flow ultrafiltration is employed to reduce low molecular weight impurities having molecular weight less than about 10,000. In other more specific embodiments, tangential flow ultrafiltration is employed to reduce low molecular weight impurities having molecular weight less than about 5000. In other more specific embodiments, tangential flow ultrafiltration is employed to reduce low molecular weight impurities having molecular weight less than about 1000. In specific embodiments, tangential flow ultrafiltration is continued until 10% or less, 5% or less, 3% or less, 2% or less or 1% or less by weight of impurities having molecular weight less than the indicated molecular weight above is reached.

In specific embodiments, tangential flow ultrafiltration is applied to lower the level of such low molecular weight saccharides to less than 10% by weight. More specifically, the level of such low molecular weight saccharides can be lowered to less than 5%, less than 3%, less than 2% or less than 1% by weight. For certain applications, it is preferred to minimize the level of low molecular weight compounds, particularly saccharides, in the phytoglycogen preparation and as such in a specific embodiment, tangential flow ultrafiltration is continued until the amount of such low molecular weight compounds, particularly saccharides, are minimized.

In another aspect, the invention provides a method for providing a lower viscosity phytoglycogen material by subjecting an extract containing phytoglycogen (or purified phytoglycogen material) to beta-amylolysis (i.e. hydrolysis using beta-amylase). More specifically the extract is a water extract. In a specific embodiment, a crude extract containing phytoglycogen is treated with beta-amylase such that the viscosity of an aqueous solution of beta-amylase treated phytoglycogen is lowered by 25% or more compared to the viscosity of an analogous solution of untreated-phytoglycogen. In more specific embodiments, a crude extract containing phytoglycogen is treated with beta-amylase to reduce the viscosity by 30% or more, 40% or more or 50% or more.

In other embodiments, crude phytoglycogen extract is subjected to beta-amylase treatment to release maltose. More specifically, beta-amylase treatment is continued until the level of maltose in the extract is 1% (based on the original amount of phytoglycogen) by weight or more. In specific embodiments, beta-amylase treatment is continued until the level of maltose in the extract is 5% by weight or more, 10% by weight or more or 15% by weight or more. In additional embodiments, beta-amylase treatment is continued to produce a beta-dextrin exhibiting a reduction in average molecular weight compared to the starting phytoglycogen of at least 1%, and less than 5%, 10%, 15%, 20%, 25%, or 50%. In other embodiments, beta-amylase treatment is continued to produce a beta-dextrin exhibiting a reduction in average molecular weight compared to the starting phytoglycogen of at least 5%, and less than 10%, 15%, 20%, 25%, or 50%.

In a specific embodiment, beta-amylase treatment is applied to a crude phytoglycogen extract. In another embodiment, beta-amylase treatment is applied to purified phytoglycogen material from which low molecular weight impurities such as low molecular weight saccharides have already been reduced or removed.

In related embodiments, the invention provides methods for providing beta-dextrins from phytoglycogen where ultrafiltration is applied after beta-amylase treatment to reduce maltose generated by beta-amylase treatment. In such methods, ultrafiltration is applied to remove 30% by weight or more of the maltose generated by beta-amylase treatments. In more specific embodiments, ultrafiltration is applied to remove 60% by weight or more or 75% by weight or more of the maltose generated by beta-amylase.

For certain applications, it is preferred to minimize the level of low molecular weight saccharides in the beta-dextrin preparation and as such in a specific embodiment, ultrafiltration is continued until the amount of maltose and other low molecular weight saccharides are minimized. In specific embodiments, the ultrafiltration method applied is tangential flow ultrafiltration. In additional embodiments, beta-amylase treatment is continued to produce a beta-dextrin exhibiting a reduction in average molecular weight compared to the starting phytoglycogen of at least 1%, and less than 5%, 10%, 15%, 20%, 25%, or 50%. In other embodiments, beta-amylase treatment is continued to produce a beta-dextrin exhibiting a reduction in average molecular weight compared to the starting phytoglycogen of at least 5%, and less than 10%, 15%, 20%, 25%, or 50%.

The invention also relates to beta-dextrins prepared by treatment of phytoglycogen extracts or purified phytoglycogen with beta-amylase. In specific embodiments, such materials are prepared by treatment with beta-amylase until certain desired reductions in viscosities or average molecular weight are obtained or until certain desired levels of release of maltose are obtained as described herein. The invention additionally relates to derivatives of beta-dextrins analogous to art-known derivatives of phtyoglycogens. In particular, the invention provides succinate and alkenyl succinate derivatives of such beta-dextrins of phytoglycogen and beta-dextrins of succinate or alkenyl succinate derivatives of phytoglycogen. In specific embodiments, the alkenyl succinates are those in which the alkenyl groups of the succinate have from 7 to 20 carbon atoms and more specifically where the alkenyl groups of the succinate have 7 to 12 carbon atoms. In more specific embodiments, the alkenyl succinates of phytoglycogen or beta-dextrin are octenyl succinates. These materials can be used, for example, in food processing, as food additives, surface active agents, and emulsification agents.

Bi et al. 2011 a, b, for example, provide description of certain phytoglycogen derivatives and methods of making such derivatives which can be employed in the present invention. This reference is incorporated by reference herein in its entirety for its descriptions of phytoglycogen derivatives, as well as reagents and methods for their preparation.

Plant phytoglycogen is extracted from plant material, preferably finely ground plant material, by contact with water to extract water-soluble materials. Any art-known method for grinding the plant material can be employed. Non-soluble solids and oil are separated from the aqueous extract. Any art-known method and equipment for performing this separation on any appropriate scale can be employed, e.g., filtration, centrifugation, etc. The extract is optionally treated to reduce proteins, for example by heat treatment or enzyme treatment, followed by separation of denatured or degraded protein or peptides to generate crude extract containing phytoglycogen. In specific embodiments, protein levels are reduced to 10% by weight or less, 5% by weight or less or preferably to 1% by weight or less. Crude extract contains low molecular weight impurities, in particular, low molecular weight saccharides (e.g., mono-, di- and/or oligosaccharides) and may contain protein and/or peptides dependent upon optionally protein reduction treatment. In prior art methods, the crude extract is subjected to precipitation with one or more organic solvents, the precipitate is collected and typically washed and dried by any of a variety of means to provide a dried phytoglycogen powder or solid.

In the methods herein water is employed to extract plant materials to generate water extracts containing phytoglycogen. The term 'water" is used broadly herein to apply to water, including water with any acceptable level of dissolved salts (including an aqueous buffer, if desired) and water of any acceptable purity level in view of the ultimate use of the product. More specifically, water includes, among others, deionized water, distilled water and deionized/distilled water. In some applications, potable water may be appropriate. In some applications, USP purified water may be appropriate. In some application, it may be desirable to control the level of ions, organics, particulates, pyrogens (pyrogen-free water may be used), colloids or bacteria (e.g., sterilized water may be used). Methods for obtaining water of a desired level of purity or quality, as noted above, are well-known in the art and can be readily employed to obtain water of a desired grade, quality or purity.

In the present invention, ultrafiltration is employed to treat crude extracts containing phytoglycogen to reduce low molecular-weight soluble compounds in the dispersion, such as saccharides, particularly mono- and disaccharides, peptides, and soluble proteins. Ultrafiltration can follow the removal of solid particles and oil, and/or be arranged at any other purification stages that are appropriate. In a specific embodiment, ultrafiltration can follow protein reduction. In a specific embodiment, crude extracts are first treated to reduce protein levels as noted above and then treated with ultrafiltration to reduce the levels of low molecular weight impurities. Multiple ultrafiltration steps can be employed, however to minimize process steps and costs, a single ultrafiltration step can be employed. Solid particles and oil can be removed by any art-known method.

Methods herein do not require precipitation and washing steps as in prior art methods.

In a specific embodiment, tangential flow ultrafiltration (TFU) (also called cross-flow ultrafiltration) is used to achieve an effective separation between phytoglycogen and lower molecular weight impurities, such as saccharides, peptides and proteins. The molecular weight cut-off (MWCO) of ultrafiltration membrane used can range from $500$-$5 \times 10^6$ daltons. In specific embodiments, the MWCO of the ultrafiltration membrane is 100 to 1000 thousand Daltons (kDa). In specific embodiments, the MWCO of the ultrafiltration membrane is 100 to 5000 kDa. See Zeman, L. J. & Zydney, A. L. (1996) *Microfiltration and Ultrafiltration; principles and applications*, Marcel Dekker, Inc., and Ghosh, R. (2008) "Biopharmaceutical Separations by Ultrafiltration," in *Advanced Membrane Technology and Applications* (ed. Li N. N. et al.) John Wiley & Sons, Inc., for descriptions of ultrafiltration methods and selection of ultrafiltration membranes.

Ultrafiltration methods which employ pressure to push liquid through membranes can be employed. Centrifugal ultrafiltration also can be employed. Tangential or cross-flow methods of ultrafiltration are preferred.

Figure 2:
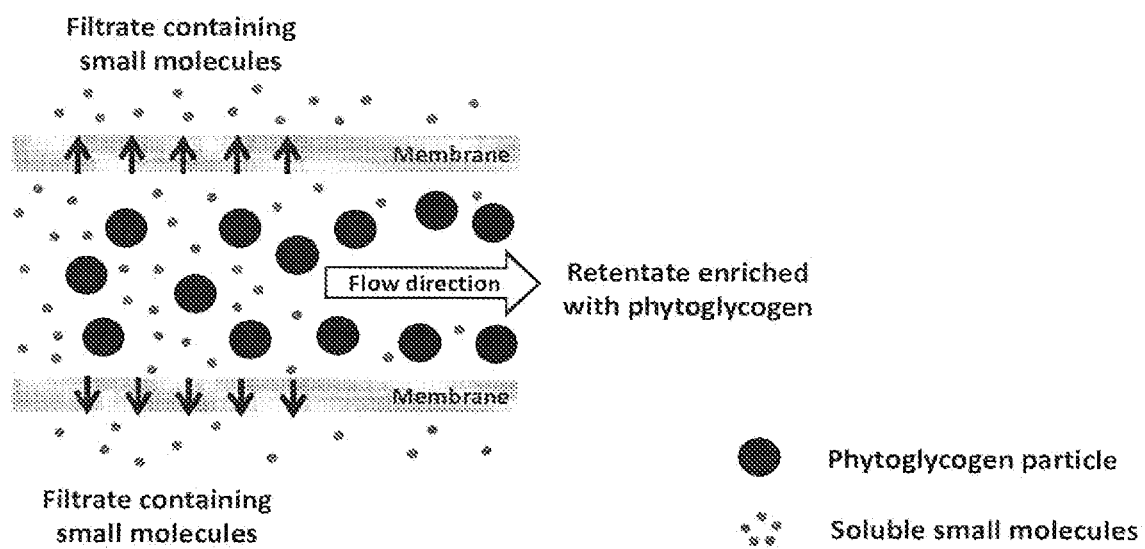
FIG. 2 is a schematic illustration of tangential flow ultrafiltration to purify phytoglycogen.

FIG. 2 illustrates the mechanism of tangential flow ultrafiltration (TFU), showing that a mixture of phytoglycogen and soluble small molecules can be separated into two portions: one portion (filtrate) that contains small molecules and a negligible amount of phytoglycogen particles, and another portion (retentate) that contains an enhanced percentage of phytoglycogen and reduced percentage of small molecules. With increased recycling times of retentate during TFU operation, the amount of small molecules in the retentate can be gradually reduced. It is noted that the phytoglycogen and derivatives thereof can be in the form of particles of varying sizes. In a specific embodiment, particles are nanoparticles. The particle size of particle of phytoglycogen or derivatives thereof can be changed by enzymatic and/or chemical treatment.

Eventually the purity of phytoglycogen in the retentate dispersion can reach a certain requirement, such as below 10, 5, or 1% (by weight of the phytoglycogen material) with respect to a given molecular weight range of impurities. Thereafter, various concentrating and/or drying methods, such as use of a falling film evaporator, a rising film evaporator, spray drying, freeze drying, drum drying, or combinations thereof, etc., can be used to dehydrate the phytoglycogen dispersion and/or collect the solid form of phytoglycogen product.

The purified phytoglycogen prepared by ultrafiltration as described herein is particularly useful in applications where the presence of lower molecular weight saccharides is undesirable, for example in food applications where such saccharides, particularly mono- and disaccharides, are undesirable due to issues related to taste, Maillard Reaction, or hygroscopicity.

Thus, in one aspect, methods of this invention provide phytoglycogen materials having desired lower levels of low molecular weight saccharides, particularly mono- and disaccharides, and more particularly, glucose, maltose, and sucrose, at significantly lower cost than prior art methods. In specific embodiments, the methods of this invention provide phytoglycogen materials having total levels of such low molecular weight saccharides less than 5% by weight. More specifically, phytoglycogen materials prepared by the methods herein can have lower than 3%, 2% or 1% by weight of low molecular weight saccharides, particularly lower than 1% of glucose, maltose, and/or sucrose.

In specific embodiments, methods of this invention provide phytoglycogen materials having desired lower levels of peptide and/or proteins as well as desired lower levels of low molecular weight saccharides, particularly mono- and disaccharides. Purified phytoglycogen materials of this invention can be treated as is known in the art to generate phytoglycogen derivatives, such as succinate and/or alkenyl succinate derivatives. Purified phytoglycogen materials can further be treated to at least partially degrade the phytoglycogen, such as by enzymatic or chemical treatment. Purified phytoglycogen can be treated, for example, with alpha-amylase, amyloglucosidase, or acid treatment to at least partially degrade the phytoglycogen. For example, such enzymatic of chemical treatment can be employed to reduce the particle size of native phytoglycogen. At least partially degraded phytoglycogen materials can be further purified if desired by removing low molecular weight species such as mono-, di-, and/or oligosaccharides produced through enzymatic or chemical treatment.

In additional embodiments, crude phytoglycogen materials can be derivatized and/or subjected to enzymatic or chemical treatment as discussed above and thereafter the derivatized or treated material can be subject to ultrafiltration purification of this invention to reduce undesired low molecular weight materials produced, e.g., mono- or disaccharides, from enzymatic or chemical treatment.

In another aspect, methods of this invention provide a beta-dextrin obtained by beta-amylase treatment of phytoglycogen materials of this invention. This beta-dextrin can be used as a lower viscosity alternative to phytoglycogen in a number of known applications of phytoglycogen. Phytoglycogen (crude or purified) can be derivatized (e.g., with succinate or alkenyl succinate) prior to or after treatment with beta-amylase.

A number of derivatives of phytoglycogen are known in the art. Analogous derivatives can be prepared from the beta-dextrin of phytoglycogen as described herein. Scheffler et al. 2010a and Scheffler et al. 2010b report methods of making phytoglycogen octenyl succinate and report properties thereof. The methods of this reference can likewise be applied to prepare alkenyl succinate derivatives, particularly octenyl succinate derivatives of the beta-dextrin of phytoglycogen and beta-dextrins of octenyl succinate derivatives of phytoglycogen. Analogously, the methods of this reference can be employed with routine adaptation to prepare other alkenyl succinate derivatives as well, particularly where the alkenyl group has seven to twenty carbon atoms or more specifically seven to twelve carbon atoms.

In a specific embodiment, the invention provides a method for extracting phytoglycogen from plant material which comprises the steps of:

(1) extracting phytoglycogen from plant material by contacting the plant material with water;

(2) separating solids from the combination of plant material and water to generate a water extract containing phytoglycogen; and (3) subjecting the water extract containing phytoglycogen to tangential flow ultrafiltration to reduce impurities having molecular weight of 5000 or less. In another embodiment, this method further comprises treating the water extract containing phytoglycogen to reduce proteins and peptides therefrom. In another embodiment, proteins and peptides are removed from the water extract prior to subjecting the water extract to tangential flow ultrafiltration. In another embodiment, the method comprises a step of subjecting the mixture of water extract and solids of step (1), the water extract containing phytoglycogen of step (2) or the purified water extract of step (3) to treatment with beta-amylase. In a specific embodiment, the water extract of step (2) is subjected to beta-amylase treatment. In a specific embodiment, the beta-amylase treated water extract is subjected to tangential flow ultrafiltration to reduce impurities having molecular weight of 5000 Da or less. In a specific embodiment, the beta-amylase treated water extract is subjected to tangential flow ultrafiltration to reduce impurities having molecular weight in the alternative of 300,000 Da or less, 100,000 Da or less, 50,000 Da or less, 25,000 Da or less, or 10,000 Da or less. In specific embodiments, the impurities removed are mono- or disaccharides. In specific embodiments, the impurities removed are glucose, sucrose and/or maltose. In specific embodiments, the impurities removed include peptides and proteins of 300,000 Da or less, 100,000 Da or less, 50,000 Da or less, 25,000 Da or less, or 10,000 Da or less.

In specific embodiments, removal of proteinaceous materials and other impurities can be facilitated by heating and/or pH adjustment as is known in the art. Heating or pH adjustment can result in degradation or denaturation of proteins. Denatured protein typically precipitates and can be readily separated from the treated composition.

In specific embodiments, tangential flow ultrafiltration results in a phytoglycogen preparation which in the alternative contains less than 20%, less than 10%, less than 5%, less than 3%, less than 2% or less than 1% (based on the total amount of soluble and dispersible compounds) by weight of impurities having molecular weight less than 5000. In specific embodiments, tangential flow ultrafiltration results in a phytoglycogen preparation which in the alternative contains less than 20%, less than 10%, less than 5%, less than 3%, less than 2% or less than 1% by weight of saccharides having molecular weight less than 5000.

In specific embodiments, the water extract containing phytoglycogen is dried to produce a solid or powder containing phytoglycogen. In specific embodiments, the water extract subjected to beta-amylase treatment is dried to produce a solid or powder containing beta-dextrin. (The purified extracts can also be concentrated (by evaporation) to syrup-type of materials. So there are at least two types of product formed: solid type and liquid type).

In specific embodiments, beta-amylase treatment is continued until at least 1% by weight of maltose is released from the phytoglycogen or a derivative thereof. In other specific embodiments, beta-amylase treatment is continued until at least 10% by weight of maltose is released from the phytoglycogen or a derivative thereof. In other specific embodiments, beta-amylase treatment is continued until at least 30% by weight of maltose is released from the phytoglycogen or a derivative thereof. In other specific embodiments, beta-amylase treatment is continued until at least 40% by weight of maltose is released from the phytoglycogen or a derivative thereof. In other specific embodiments, beta-amylase treatment is continued until at least 50% by weight of maltose is released from the phytoglycogen or a derivative thereof. In specific embodiments, beta-dextrins of derivatives of phytoglycogens are prepared by beta-amylase treatment as described herein. In specific embodiments, beta-dextrins of alkenyl succinate derivatives of phytoglycogens are prepared by beta-amylase treatment as described herein. In specific embodiments, beta-dextrins of octenyl succinate derivatives of phytoglycogens are prepared by beta-amylase treatment as described herein.

The invention also provides a method for reducing the viscosity of an aqueous solution containing phytoglycogen or derivatives thereof which comprises the step of subjecting the solution to treatment with beta-amylase under conditions such that the viscosity is in the alternative reduced by at least 25%, by at least 30%, by at least 40% or by at least 50%. In an embodiment, the reduced viscosity aqueous solution containing phytoglycogen or derivatives thereof which is treated with beta-amylase is subjected to tangential flow ultrafiltration to decrease maltose formed by beta-amylase treatment by at least 50%. In specific embodiments, phytoglycogen derivatives are alkenyl succinates and particularly are octenyl succinates.

The invention also provides a method for producing a beta-dextrin comprising the steps:

(1) extracting phytoglycogen from plant material by contacting the plant material with water;

(2) separating solids from the combination of plant material and water to generate a water extract containing phytoglycogen;

(3) optionally subjecting the water extract containing phytoglycogen to tangential flow ultrafiltration to reduce impurities having molecular weight of 5000 or less; and (4) subjecting the mixture of water extract and solids of step (1), the water extract containing phytoglycogen of step (2) or the purified water extract of step (3) to treatment with beta-amylase. In an embodiment of this method, a step of subjecting the water extract containing phytoglycogen to tangential flow ultrafiltration to reduce impurities having molecular weight of 5000 or less is applied after treatment with beta-amylase. In an embodiment of this method, a step of subjecting the water extract containing phytoglycogen to tangential flow ultrafiltration to reduce impurities having molecular weight of 5000 or less is applied before and after treatment with beta-amylase.

The invention provides phytoglycogen material prepared by the methods herein containing in the alternative less than 10%, less than 5%, less than 3%, less than 2% or less than 1% by weight of impurities having molecular weight less than 5000. The invention provides phytoglycogen material prepared by the methods herein containing in the alternative less than 10%, less than 5%, less than 3%, less than 2% or less than 1% by weight of saccharides having molecular weight less than 5000. The invention provides phytoglycogen material prepared by the methods herein containing in the alternative less than 10%, less than 5%, less than 3%, less than 2% or less than 1% by weight of sucrose, maltose, and/or glucose. The methods for producing phytoglycogen herein can employ plant material from corn, rice, barley, or sorghum. In specific embodiments, the phytoglycogens are prepared from corn, more specifically from sweet corn and yet more specifically from sweet corn kernels.

The invention provides a beta-dextrin obtained from plant material by the method herein in which phytoglycogen is treated with beta-amylase. In specific embodiments, the beta-dextrins are prepared from plant materials from corn, rice, sorghum, or barley. In specific embodiments, the beta-dextrins are prepared from plant materials from corn, more specifically sweet corn and more specifically from corn kernels.

The invention additionally provides alkenyl succinate derivatives of a beta-dextrin wherein the beta-dextrin is prepared by treatment of phytoglycogen with beta-amylase. The invention additionally provides beta-dextrins of alkenyl succinate derivatives of phytoglycogen wherein the beta-dextrin is prepared by treatment of alkenyl succinate derivatives of phytoglycogen with beta-amylase.

The description of the invention refers to reducing or removing impurities. Reduction of impurities is assessed with respect to the level of impurities present in crude phytoglycogen extracts, particularly water extracts. Impurity levels can be quantitatively assessed as weight % of impurities of certain molecular weight ranges present in purified phytoglycogen materials. As noted above, reduction of impurities of 5000 Da or less, 10,000 Da or less, 25,000 Da or less, 50,000 Da or less, 100,000 Da or less or 300,000 Da or less can be targeted by the methods herein. The term reducing impurities is used herein to refer to the reduction of impurities to below a desirable level.

It will also be appreciated that after purification of phytoglycogen material by the methods of the present invention that it can be beneficial to a given application to add one or more additives to the phytoglycogen material. Such additives are typically not naturally present in extracted phytoglycogen materials and may include surface active materials, such as one or more surfactants or wettings agents, preservatives, such as one or more antimicrobial agents.

When a Markush group or other grouping is used herein, all individual members of the group and all combinations and subcombinations possible of the members of the groups therein are intended to be individually included in the disclosure. Every formulation or combination of components described or exemplified herein can be used to practice the invention, unless otherwise stated.

One of ordinary skill in the art will appreciate that methods, procedures, reagents, and materials, other than those specifically disclosed herein, can be employed in the practice of the invention without resort to undue experimentation. All art-known functional equivalents, of any such methods, materials and conditions are intended to be included in this invention. For example beta-amylase from various art-known sources can be employed. It should also be appreciated that the methods of this invention can be employed to further purify commercially available phytoglycogen from any source which contains low molecular weight impurities including low molecular weight saccharides. Beta-dextrins of this invention can likewise be prepared from commercially available phytoglycogen from any source. It will further be appreciated that variations of tangential flow ultrafiltration methods known in the art can be applied for the practice of the methods herein without undue experimentation in view of the teachings herein.

Whenever a range is given in the specification, for example, a range of numbers, a range of any integer, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the broad term "comprising", particularly in a description of components of a composition, the recitation of steps in a method or in a description of elements of a device, is intended to encompass and describe the terms "consisting essentially of" or "consisting of".

Although the description herein contains many specifics, these should not be construed as limiting the scope of the invention, but as merely providing illustrations of some of the embodiments of the invention.

Each reference cited herein is hereby incorporated by reference herein in its entirety. Cited references are incorporated by reference herein at least in part as an indication of the state of the art at the time of filing. Some references are incorporated herein to provide details of the structure and composition of phytoglycogen, details of methods for obtaining crude extracts containing phytoglycogen and plant sources for phytoglycogen.

THE EXAMPLES

Example 1

Two hundred grams of kernels of sweet corn (Silver Queen sugary-1 (su1)) were coarsely ground and 2 L pre-cooled (4° C.) deionized water were added to the ground corn. The mixture was homogenized using a high speed blender, passed through a 270-mesh sieve, and centrifuged at 10,000×g for 20 minutes at 4° C. The solid is optionally further extracted with deionized water. The supernatant obtained was heated to 100° C. using microwave, cooled, and stored in a 4° C. refrigerator. This liquid was the crude extract of phytoglycogen (named herein "crude extract"). See Huang & Yao 2011 for additional variation in methods for obtaining crude extract.

Example 2

From the stock of crude extract, 100 mL was applied to a tangential flow ultrafiltration system (Minimate TFF system, Pall Life Science). The processing conditions were: membrane (polyethersulfone) with molecular weight cut-off (MWCO) of 300 kD, temperature 22° C., and feed pressure 10 psi. When the initial volume of feed (100 mL) was reduced to 30 mL, 30 mL deionized water was added to the retentate. Meanwhile, the resulting filtrate was collected in aliquots for later analysis. When the volume of retentate was again reduced to 10 mL, 20 mL deionized water was added. When the volume of retentate was once again reduced to 10 mL, 20 mL deionized water was added and an aliquot was then taken (named herein "retentate-1"). Again, when the volume of retentate was reduced to 10 mL, 20 mL water was added and the volume of retentate was reduced to about 10 mL. This retentate was collected and is in these Examples called "pure phytoglycogen".

Figure 3:
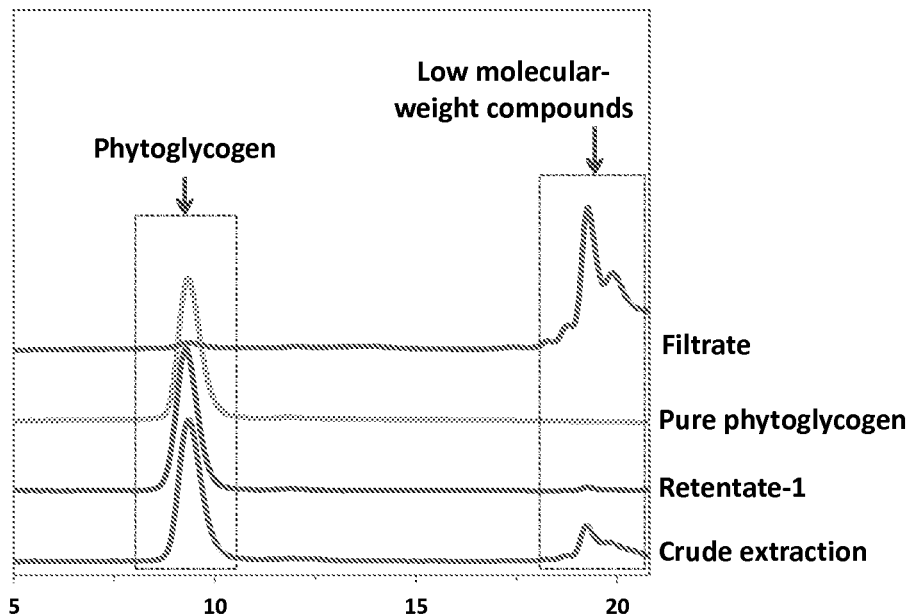
FIG. 3 is an illustration comparing High Performance Size-Exclusion (HPSEC) chromatograms of crude extract, retentate-1, pure phytoglycogen and filtrate. The peaks associated with phytoglycogen and low molecular-weight compounds are indicated with arrows.

The crude extract, filtrate, retentate-1, and pure phytoglycogen were subjected to analysis using high performance size-exclusion chromatography (HPSEC). For each sample (after appropriate dilution using deionized water), 20 µL was injected into the HPSEC system, which held two connected Zorbax gel PSM 60-S columns (6.2×250 mm, Agilent Tech., Santa Clara, Calif.). The flow rate was 0.5 mL/min, with DMSO as the mobile phase. The elution was monitored by a Waters 2414 refractive index (RI) detector (Waters, Mass.). FIG. 3 shows the chromatograms for each fraction noted above after being normalized using the highest peak.

Table 1 lists the approximate percentages of phytoglycogen and impurities in various materials indicated in FIG. 3.

TABLE 1

Approximate percentages of phytoglycogen and impurities in crude extract, retentate-1, pure phytoglycogen, and filtrate:

| | Percentage, % | | | |
|---|---|---|---|---|
| | Crude extract | Retentate-1 | Pure phytoglycogen | Filtrate |
| Phytoglycogen | 71.3 | 96.4 | 100 | 4.4 |
| Low MW impurities | 28.7 | 3.6 | 0 | 95.6 |

As shown in Table 1, in the crude extraction of phytoglycogen, there was about 28.7% of low molecular-weight, soluble impurities. After ultrafiltration, the impurities were reduced to 3.6% for retentate-1 and to an undetectable level for pure phytoglycogen. In the filtrate, the impurities were enriched to 95.6%, whereas the phytoglycogen (lost in the filtrate) was only 4.4%. Tangential flow ultrafiltration provides a very effective purification of phytoglycogen from crude extract, and the purity of phytoglycogen can be controlled by the extent of recycling of retentate in the ultrafiltration system.

Example 3

From the crude extract of phytoglycogen (Example 1), 500 mL was applied to the tangential flow ultrafiltration system (Minimate). The processing conditions were: membrane with MWCO of 300 kD, temperature 22° C., feed pressure 25 psi. During the recycling process, deionized water was added periodically to the feed/retentate.

Eventually, the volume of retentate was reduced to 50 mL. This retentate was collected and designated "pure phytoglycogen".

To 30 mL of pure phytoglycogen solution (pH6.5) was added 10 µL of beta-amylase (284 U, Megazyme). The combination was mixed, and placed in a shaking water bath (50° C.) for 20 minutes. This procedure allows for a hydrolysis of phytoglycogen by beta-amylase. After incubation, the resultant mixture was heated in a boiling-water bath to denature the enzyme and thereafter cooled. The material collected was designated "beta-dextrin with maltose", since the material collected contained two primary materials: beta-dextrin of phytoglycogen and maltose released during beta-amylolysis.

To reduce the amount of maltose in the product of beta-amylolysis of phytoglycogen, the mixture of beta-dextrin and maltose (30 mL) was applied to the Minimate system for ultrafiltration. Deionized water 30 mL was added to the feed and the retentate was concentrated to 20 mL. Thereafter, 40 mL water was added to the feed and the retentate was again concentrated to 20 mL. The retentate was collected and designated "beta-dextrin with reduced maltose".

Figure 4:
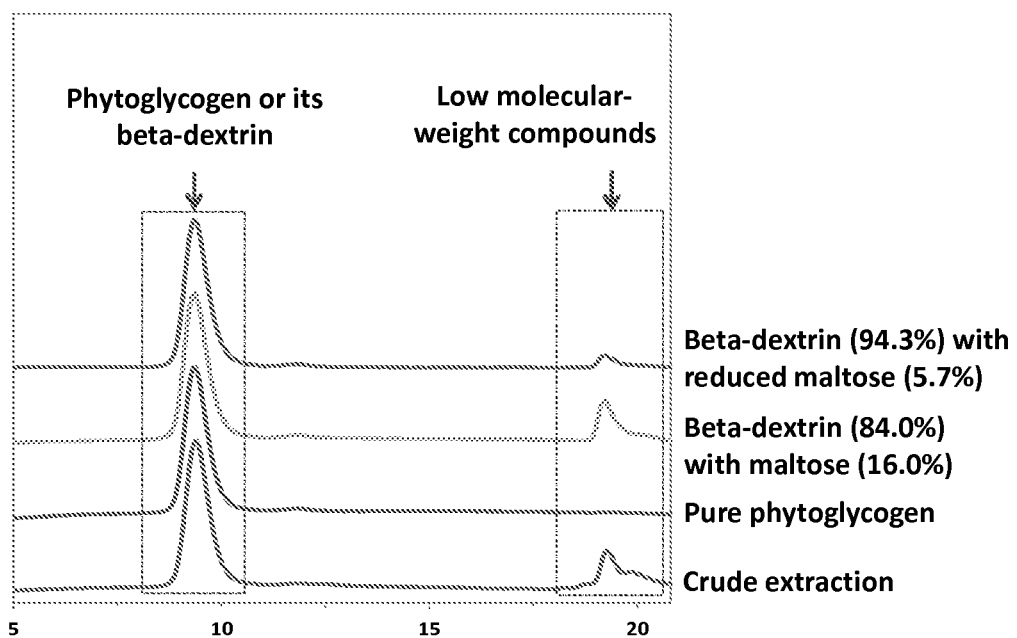
FIG. 4 is an illustration comparing High Performance Size-Exclusion (HPSEC) chromatograms of crude extract, pure phytoglycogen, beta-dextrin with maltose, and beta-dextrin with reduced maltose. The peaks associated with phytoglycogen or its beta-dextrin and low molecular-compounds are indicated.

The carbohydrate profiles of crude extract, pure phytoglycogen, beta-dextrin with maltose, and beta-dextrin with reduced maltose were analyzed using HPSEC (FIG. 4). The approximate percentages of beta-dextrin and maltose are indicated in FIG. 4.

As shown in FIG. 4, beta-amylolysis of phytoglycogen generated beta-dextrin of phytoglycogen and released maltose with a yield of around 16%. The use of ultrafiltration effectively reduced the amount of maltose to 5.7%.

Example 4

The viscosities of two samples: pure phytoglycogen and beta-dextrin with reduced maltose were measured using a Brookfield Rheometer (DV-III), with spindle SC4-16 in LV model. Both samples were adjusted to 15.2% (w/w). Table 2 shows the RPM and viscosity (mPas) for each sample. Under the same conditions, beta-dextrin prepared from phytoglycogen has a significantly lower viscosity than phytoglycogen. This finding is useful for preparing low-viscosity phytoglycogen derivatives that are desirable for food formulation and processing. It was also found that tangential flow ultrafiltration is an effective approach to reduce or remove maltose released during the preparation of beta-dextrin of phytoglycogen.

TABLE 2 viscosity of phytoglycogen and its beta-dextrin measured using Brookfield Rheometer

| Sample | RPM | Viscosity (mPas) (mean ± SD, n = 3) |
| --- | --- | --- |
| Pure phytoglycogen | 25 | 3645 ± 315 |
|  | 30 | 3166 ± 453 |
| Beta-dextrin with reduced maltose | 25 | 1448 ± 143 |
|  | 30 | 1207 ± 120 |

Literature Cited

1. Bi, L., Yang, L., Narsimhan, G., Bhunia, A., Yao, Y. (2011a). Designing carbohydrate nanoparticles for prolonged efficacy of antimicrobial peptide. *Journal of Controlled Release,* 150: 150-156
2. Bi, L., Yang, L., Bhunia, A., Yao, Y. (2011b). Carbohydrate nanoparticle-mediated colloidal assembly for prolonged efficacy of bacteriocin against food pathogen. *Biotechnology and Bioengineering,* 108: 1529-1536
3. Boyer, C. D. & Liu, K. C. (1983). Starch and water-soluble polysaccharides from sugary endosperm of sorghum. Phytochemistry, 22, 2513-2515.
4. Burton, R. A., Jenner, H., Carrangis, L., Fahy, B., Fincher, G. B., Hylton, C., et al. (2002). Starch granule initiation and growth are altered in barley mutants that lack isoamylase activity. Plant Journal, 31, 97-112.
5. Huang, L., Yao, Y. (2011). Particulate structure of phytoglycogen nanoparticles probed using amyloglucosidase. *Carbohydrate Polymers,* 83, 1665-1671.
6. James, M. G., Robertson, D. S., Myers, A. M. (1995). Characterization of the maize gene sugary1, a determinant of starch composition in kernels. Plant Cell, 7: 417-429.
7. Scheffler, S. L., Wang, X., Huang, L., San-Martin Gonzalez, F., Yao, Y. (2010a). Phytoglycogen octenyl succinate, an amphiphilic carbohydrate nanoparticle, and ε-polylysine to improve lipid oxidative stability of emulsions. *Journal of Agricultural and Food Chemistry,* 58: 660-667
8. Scheffler, S. L., Huang, L., Bi, L., Yao, Y. (2010b). In vitro digestibility and emulsification properties of phytoglycogen octenyl succinate. *Journal of Agricultural and Food Chemistry,* 58, 5140-5146
9. Shin, J., Simsek, S., Reuhs, B. L., Yao, Y. (2008). Glucose release of water-soluble starch-related alpha-glucans by pancreatin and amyloglucosidase is affected by the abundance of alpha-1,6-glucosidic linkages. *Journal of Agricultural and Food Chemistry,* 56: 10879-10886
10. Zeeman, S. C., Umemoto, T., Lue, W. L., Au-Yeyng, P., Martin, C., Smith, A. M., et al. (1998). A mutant of *Arabidopsis* lacking a chloroplastic isoamylase accumulates both starch and phytoglycogen. Plant Cell, 10, 1699-1711.

I claim:

1. A method for extracting soluble phytoglycogen from kernels or fractions of kernels of a maize mutant surgary-1 (su-1) comprises: (1) contacting the kernels or fractions of kernels with water; (2) separating and removing solids from the combination of kernels or fractions of kernels and water to generate a water extract containing soluble phytoglycogen; (3) subjecting the water extract containing soluble phytoglycogen to tangential flow ultrafiltration to reduce saccharide impurities having molecular weight of 300,000 Daltons (Da) or less; and (4) collecting aqueous retentate fraction of ultrafiltration that comprises at least 90% purity (dry weight base) of soluble phytoglycogen components of molecular weight above 300,000 Da.

2. The method of claim 1 further comprising treating the water extract containing phytoglycogen to reduce proteins and peptide therefrom.

3. The method of claim 2 wherein proteins and peptides are reduced from the water extract prior to subjecting the water extract to ultrafiltration.

4. The method of claim 1 wherein the purified soluble phytoglycogen contains less than 1% by weight of impurities having molecular weight of 300,000 Da or less.

5. The method of claim 1 wherein the purified soluble phytoglycogen contains less than 1% by weight of saccharides having molecular weight of 300,000 Da or less.

6. The method of claim 1, wherein the kernels or fractions of kernels are ground before or after they are contacted with water.

7. The method of claim 1, wherein the collected aqueous retentate fraction of ultrafiltration in step (4) is further subjected to extended tangential flow ultrafiltration to increase the purity of phytoglycogen having molecular weight above about 300,000 Da.

* * * * *